(12) United States Patent
Okuma et al.

(10) Patent No.: US 10,358,068 B2
(45) Date of Patent: Jul. 23, 2019

(54) CONVEYANCE SEAT

(71) Applicant: TS TECH CO., LTD., Asaka-shi, Saitama (JP)

(72) Inventors: Kei Okuma, Tochigi (JP); Kazuaki Mima, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 15/852,126

(22) Filed: Dec. 22, 2017

(65) Prior Publication Data

US 2018/0257529 A1  Sep. 13, 2018

(30) Foreign Application Priority Data

Mar. 9, 2017 (JP) .................. 2017-045189

(51) Int. Cl.
*B60N 2/75* (2018.01)
(52) U.S. Cl.
CPC .................. *B60N 2/757* (2018.02)
(58) Field of Classification Search
CPC ...................................... B60N 2/757
USPC .................................. 297/113, 238
See application file for complete search history.

(56) References Cited

U.S. PATENT DOCUMENTS

| 2,085,836 A | * | 7/1937 | Tatum ................ B60N 2/767 297/113 X |
| 2,278,749 A | * | 4/1942 | Todd ................ A47C 7/543 297/113 |
| 2,584,481 A | * | 2/1952 | Mast ................ B60N 2/3084 297/113 |
| 2,824,599 A | * | 2/1958 | Quinlan ................ A47C 7/70 297/113 X |
| 3,168,346 A | * | 2/1965 | Rei, Jr. ................ B60N 2/757 297/113 |
| 3,666,319 A | * | 5/1972 | Moloney, Jr. ........ B60N 2/757 297/113 |
| 3,909,063 A | * | 9/1975 | Bonisch ................ B60N 2/753 297/113 |

(Continued)

FOREIGN PATENT DOCUMENTS

| JP | H06-052608 U | 7/1994 |
| JP | 2001-258678 A | 9/2001 |

(Continued)

OTHER PUBLICATIONS

PCT Search Report and Written Opinion issued in related application PCT/JP2017/035155, dated Dec. 26, 2017, with partial English language translation, 10 pages.

*Primary Examiner* — Rodney B White
(74) *Attorney, Agent, or Firm* — Drinker Biddle & Reath LLP

(57) ABSTRACT

A rear-side end of a protrusion configured to prevent an armrest stored in a storage space from pivoting to a usage position is formed at a side of a seat back, the side defining at the storage space. The armrest has a pad and a cover covering the pad. The pad has a back-side end engageable with the rear-side end. The rear-side end of the protrusion is arranged on a path of the back-side end of a recess, the path created when the armrest pivots from the usage position to the storage position. The back-side end of the recess is arranged rearward of the rear-side end of the protrusion when the armrest is at the storage position.

19 Claims, 5 Drawing Sheets

(56) References Cited

U.S. PATENT DOCUMENTS

| | | | | |
|---|---|---|---|---|
| 3,951,448 A | * | 4/1976 | Hawie | B60R 7/043 297/113 |
| 4,533,175 A | * | 8/1985 | Brennan | B64D 11/0693 297/113 |
| 4,558,901 A | * | 12/1985 | Yokoyama | B60N 2/767 297/113 |
| 4,560,203 A | * | 12/1985 | Huber | B60R 22/02 297/113 |
| 4,662,674 A | * | 5/1987 | Shirai | B60N 2/757 297/113 |
| 4,722,568 A | * | 2/1988 | Irvin | B60N 2/3084 297/238 X |
| 4,759,583 A | * | 7/1988 | Schrom | B60N 2/757 297/113 |
| 4,943,112 A | * | 7/1990 | Law | B60N 2/3084 297/238 X |
| 4,973,017 A | * | 11/1990 | Takagi | B60N 3/004 297/113 X |
| 4,986,600 A | * | 1/1991 | Leblanc | B60N 2/3084 297/238 X |
| 5,076,645 A | * | 12/1991 | Yokota | B60N 2/753 297/113 X |
| 5,096,256 A | * | 3/1992 | Mouri | B60N 2/757 297/113 |
| 5,104,182 A | * | 4/1992 | Rasnick | A47C 7/62 297/113 |
| 5,106,158 A | * | 4/1992 | Dukatz | B60N 2/3084 297/238 X |
| 5,150,946 A | * | 9/1992 | Marfilius | B60N 3/101 297/113 X |
| 5,205,608 A | * | 4/1993 | Stig | B60N 2/3084 297/113 X |
| 5,224,756 A | * | 7/1993 | Dukatz | B60N 2/3084 297/238 X |
| 5,246,267 A | * | 9/1993 | Nagashima | B60N 2/757 297/113 |
| 5,280,995 A | * | 1/1994 | Elton | B60N 2/3084 297/238 X |
| 5,282,667 A | * | 2/1994 | Elton | B60N 2/3084 297/238 |
| 5,282,668 A | * | 2/1994 | Heussner | B60N 2/3084 297/238 X |
| 5,286,084 A | * | 2/1994 | Bart | B60N 2/3084 297/238 X |
| 5,287,412 A | * | 2/1994 | Etzel | B60R 11/0217 297/113 X |
| 5,292,171 A | * | 3/1994 | Harrell | B60N 2/757 297/113 |
| 5,312,156 A | * | 5/1994 | Heussner | B60N 2/3084 297/238 X |
| 5,322,344 A | * | 6/1994 | Hoffman | A47C 7/70 297/113 |
| 5,332,284 A | * | 7/1994 | Elton | B60N 2/3084 297/238 |
| 5,342,115 A | * | 8/1994 | De Filippo | B60N 2/753 297/113 X |
| 5,352,012 A | * | 10/1994 | Chowdhury | B60N 2/757 297/113 |
| 5,364,169 A | * | 11/1994 | Collins | B60R 22/105 297/238 |
| 5,366,270 A | * | 11/1994 | Heussner | B60N 2/2878 297/238 |
| 5,375,907 A | * | 12/1994 | Rogers | A47C 7/70 297/113 |
| 5,380,060 A | * | 1/1995 | Sponsler | B60N 2/3011 297/238 |
| 5,383,707 A | * | 1/1995 | Osenkowski | B60N 2/3084 297/238 |
| 5,385,384 A | * | 1/1995 | Gierman | B60N 2/3084 297/238 X |
| 5,409,297 A | * | 4/1995 | De Filippo | B60N 2/757 297/113 X |
| 5,429,414 A | * | 7/1995 | Olsson | B60N 2/3084 297/238 X |
| 5,433,503 A | * | 7/1995 | De Filippo | B60N 2/757 297/113 X |
| 5,449,216 A | * | 9/1995 | Gierman | B60N 2/3084 297/238 X |
| 5,449,223 A | * | 9/1995 | Miculici | B60R 22/105 297/238 X |
| 5,466,043 A | * | 11/1995 | Lambert | B60N 2/3084 297/238 X |
| 5,468,044 A | * | 11/1995 | Coman | B60N 2/3084 297/238 X |
| 5,468,045 A | * | 11/1995 | Weber | B60N 2/2884 297/238 X |
| 5,468,046 A | * | 11/1995 | Weber | B60N 2/3084 297/238 X |
| 5,472,260 A | * | 12/1995 | Czapski | B60N 2/3084 297/238 X |
| 5,476,305 A | * | 12/1995 | Corkins | B60N 2/3084 297/238 X |
| 5,498,062 A | * | 3/1996 | Holdampf | B60N 2/3084 297/238 X |
| 5,529,381 A | * | 6/1996 | Zhao | B60R 22/105 297/238 |
| 5,540,479 A | * | 7/1996 | Thomas | B60N 2/757 297/113 |
| 5,568,959 A | * | 10/1996 | Weber | B60N 2/757 297/238 |
| 5,588,700 A | * | 12/1996 | Homier | B60N 2/3084 297/238 X |
| 5,601,334 A | * | 2/1997 | Marks | B60N 2/3084 297/238 X |
| 5,603,550 A | * | 2/1997 | Holdampf | B60N 2/3013 297/238 X |
| 5,611,603 A | * | 3/1997 | Gray | B60R 22/105 297/238 X |
| 5,628,543 A | * | 5/1997 | Filipovich | B60R 5/006 297/113 |
| 5,653,504 A | * | 8/1997 | Henson | B60N 2/3084 297/238 |
| 5,658,043 A | * | 8/1997 | Davidson | B60N 2/753 297/113 |
| 5,662,377 A | * | 9/1997 | Holdampf | B60N 2/3013 297/238 X |
| 5,700,054 A | * | 12/1997 | Lang | B60N 2/3084 297/238 |
| 5,704,684 A | * | 1/1998 | Dukatz | B60N 2/3084 297/238 |
| 5,704,685 A | * | 1/1998 | Handa | B60N 2/3084 297/238 |
| 5,716,097 A | * | 2/1998 | Peck | B60N 2/3084 297/238 |
| 5,743,593 A | * | 4/1998 | Vogt | B60N 2/3084 297/238 |
| 5,752,739 A | * | 5/1998 | Saeki | B60N 2/757 297/113 |
| 5,775,771 A | * | 7/1998 | La Cour | B60N 2/3084 297/238 X |
| 5,788,324 A | * | 8/1998 | Shea | B60N 3/101 297/113 |
| 5,788,326 A | * | 8/1998 | Kawade | B60N 2/2812 297/238 X |
| 5,873,633 A | * | 2/1999 | Lang | B60N 2/3084 297/411.32 |
| 5,899,534 A | * | 5/1999 | Gray | B60N 2/3084 297/238 |
| 6,047,444 A | * | 4/2000 | Braun | E05D 11/1007 297/113 X |
| 6,048,027 A | * | 4/2000 | Peck | B60N 2/3084 297/238 |
| 6,073,996 A | * | 6/2000 | Hatsuta | B60N 2/5891 297/113 |
| 6,089,662 A | * | 7/2000 | Lambert | B60R 22/105 297/238 |
| 6,213,546 B1 | * | 4/2001 | Malusev | B60N 2/757 297/113 |

(56) References Cited

U.S. PATENT DOCUMENTS

| | | | | |
|---|---|---|---|---|
| 6,217,112 B1* | 4/2001 | Linsenmeier | ......... | B60N 3/108 |
| | | | | 297/113 |
| 6,386,629 B1* | 5/2002 | Severinski | ........... | B60N 2/3011 |
| | | | | 297/113 X |
| 6,547,323 B1* | 4/2003 | Aitken | ................... | B60N 2/793 |
| | | | | 297/113 |
| 6,572,188 B2* | 6/2003 | Ozawa | ................... | B60N 2/757 |
| | | | | 297/238 |
| 6,641,212 B2* | 11/2003 | Sitzler | ................... | B60R 5/006 |
| | | | | 297/113 X |
| 7,178,865 B2* | 2/2007 | Yetukuri | ................ | B60N 2/757 |
| | | | | 297/113 |
| 7,458,634 B2* | 12/2008 | Schlecht | ................ | B60N 2/757 |
| | | | | 297/113 |
| 7,644,984 B2* | 1/2010 | Chalhoub | ................ | B60N 2/58 |
| | | | | 297/113 |
| 8,282,160 B2* | 10/2012 | Lutzka | ................... | B60N 2/753 |
| | | | | 297/113 |
| 8,317,259 B2* | 11/2012 | Nakaya | ................ | B60N 2/4228 |
| | | | | 297/113 X |
| 8,622,468 B2* | 1/2014 | Masuda | ................. | B60R 5/006 |
| | | | | 297/113 |
| 8,789,881 B2* | 7/2014 | von Rothkirch und Panthen | ....... | |
| | | | | B60N 2/77 |
| | | | | 297/113 |
| 8,864,224 B2* | 10/2014 | Kobayashi | ........... | B60N 2/3011 |
| | | | | 297/113 |
| 8,950,814 B2* | 2/2015 | Lohmann | ............. | B60N 2/3009 |
| | | | | 297/238 X |
| 8,960,786 B2* | 2/2015 | Henke | ................... | B60N 2/757 |
| | | | | 297/113 |
| 9,022,328 B2* | 5/2015 | Mayer | ................... | B60N 2/753 |
| | | | | 297/411.38 X |
| 9,022,463 B2* | 5/2015 | Cha | ........................ | B60N 2/757 |
| | | | | 297/113 |
| 9,469,225 B1* | 10/2016 | Salenbien | ............... | B60N 2/757 |
| 10,183,597 B2* | 1/2019 | Jakubec | ................... | B60N 2/43 |
| 10,189,389 B2* | 1/2019 | Jakubec | ................... | B60N 2/757 |
| 10,227,027 B2* | 3/2019 | Edwards | ................ | B60N 2/206 |
| 2004/0140697 A1* | 7/2004 | Yuhki | .................... | B60N 2/793 |
| | | | | 297/113 |
| 2007/0013212 A1* | 1/2007 | Meister | .................... | B60N 2/76 |
| | | | | 297/113 X |
| 2007/0069561 A1* | 3/2007 | Schnabel | ................ | B60R 5/006 |
| | | | | 297/238 |
| 2007/0284919 A1* | 12/2007 | Woth | .................... | B60N 2/206 |
| | | | | 297/113 |
| 2009/0160227 A1* | 6/2009 | Crombez | .................... | B60N 3/101 |
| | | | | 297/113 |
| 2011/0316310 A1* | 12/2011 | Runde | .................... | B60N 2/757 |
| | | | | 297/113 |
| 2012/0104822 A1* | 5/2012 | Henke | .................... | B60N 2/757 |
| | | | | 297/411.32 |
| 2014/0125107 A1* | 5/2014 | Cha | ........................ | B60N 2/757 |
| | | | | 297/411.3 |
| 2015/0097406 A1 | 4/2015 | Tanaka | | |
| 2016/0272093 A1* | 9/2016 | Jakubec | ................ | B60N 2/757 |
| 2016/0288672 A1* | 10/2016 | Jakubec | ................ | B60N 2/43 |
| 2016/0288675 A1* | 10/2016 | Salenbien | ............. | B60N 2/757 |
| 2018/0065520 A1* | 3/2018 | Aktas | .................... | B60N 2/757 |
| 2018/0170221 A1* | 6/2018 | Zuo | ........................ | B60N 2/919 |
| 2018/0178688 A1* | 6/2018 | Zuo | ........................ | B60N 2/757 |

FOREIGN PATENT DOCUMENTS

| | | |
|---|---|---|
| JP | 2002-186542 A | 7/2002 |
| JP | 2015-074235 A | 4/2015 |

\* cited by examiner

CONVEYANCE SEAT

CROSS REFERENCE TO RELATED APPLICATIONS

This application is based upon and claims the priority benefit of Japanese Patent Application No. JP 2017-045189, filed Mar. 9, 2017, the contents being incorporated herein by reference.

BACKGROUND

The present disclosure relates to a conveyance seat, and in particular to a conveyance seat including an armrest that can be stored at a storage position.

Conveyance seats, for example, rear seats of vehicles have been generally known, which include armrests that can be stored in storage spaces provided at seat backs.

The seat having the armrest to be stored in the storage space of the seat back as described above has been required to have a configuration by which an occupant can pull the armrest out intentionally and the armrest can be held not to project at a sudden stop of the vehicle.

For example, Japanese Unexamined Patent Application Publication No. 2015-74235 (JP 2015-74235 A) describes a conveyance seat that includes an armrest that can be stored in a storage space (described as a receiving recess in JP 2015-74235 A) of a seat back and a stopper structure that can hold the armrest in the storage space. Specifically, regarding the stopper structure of the seat for the vehicle, a protrusion piece provided inward of a cover of the seat back defining the storage space is pressed against an outer peripheral portion of the armrest, so that the armrest is retained in the storage space.

However, as described in JP 2015-74235 A, a portion of the outer peripheral portion of the armrest configuring the stopper structure is not covered with the cover and is exposed, so that the portion is conspicuous from the outside and is likely to impair the design of the seat. Further, the portion of the outer peripheral portion of the armrest configuring the stopper structure includes accessories such as cup holders, or the like. Therefore, it has been difficult to manufacture this portion. Even when such accessories are not needed, such accessories are required to be installed for the purpose of configuring the stopper structure. This is likely to increase manufacturing cost.

SUMMARY

The present disclosure has been made in view of the above problems, and various embodiments of the present disclosure provide a seat configured to prevent an armrest from pivoting by a structure that is not conspicuous from the outside. Some embodiments of the present disclosure facilitate manufacturing a portion to prevent the armrest from pivoting and thus to reduce manufacturing cost.

An embodiment of a conveyance seat of the present disclosure includes a seat back that has a storage space and an armrest that is attached to the seat back and configured to be pivotable between a storage position where the armrest is stored in the storage space and a usage position where the armrest is pulled out of the storage space. A pivot preventing portion is formed at a side of the seat back, the side defining the storage space at the seat back, and the pivot preventing portion being configured to prevent the armrest stored in the storage space from pivoting to the usage position. The armrest includes a pad and a cover that covers the pad. The pad has a prevented portion that is engageable with the pivot preventing portion. The pivot preventing portion is arranged on a path of the prevented portion along which the armrest pivots from the usage position to the storage position. The prevented portion is arranged rearward of the pivot preventing portion when the armrest is at the storage position. According to the above-described structure, the pivot preventing portion is formed at the side of the seat back, the side defining the storage space, and the pivot preventing portion being configured to prevent the armrest stored in the storage space from pivoting to the usage position. The armrest includes the pad and the cover covering the pad. The pad has the prevented portion that is able to be engaged with the pivot preventing portion. Therefore, the pivoting of the armrest is prevented by the structure that is inconspicuous from outside. Further, the prevented portion is formed at the easily molded pad. Therefore, it is possible to manufacture easily the armrest having a structure by which the armrest is engaged with the seat back. Further, it is possible to manufacture easily the conveyance seat having such armrest. This thus allows reducing the manufacturing cost.

The armrest may be pivotally attached to the seat back via a pivot shaft and the prevented portion of the armrest may be elongated and extend in the radial direction of the pivot shaft. According to the aforementioned configuration, the prevented portion of the armrest is elongated and extends in the radial direction of the pivot shaft. Therefore, the armrest pivotally attached to a part of the seat is more easily locked to the pivot preventing portion.

The prevented portion may be a part of the recess, and the recess may be formed by a front-end portion and a rear-end portion of the pad that protrude towards the side of the seat back when the armrest is at the storage position. According to the aforementioned configuration, the recess partially having the prevented portion is formed by the front-end portion and the rear-end portion of the pad protruding towards the side of the seat back when the armrest is at the storage position. Therefore, the pivoting of the armrest is prevented by the pivot preventing portion formed at the side of the seat back and the simply-structured prevented portion of the pad.

The prevented portion may be a part of the recess, and a bottom of the recess may be formed in a planar shape. According to the aforementioned configuration, the bottom of the recess partially having the prevented portion is formed in a planar shape. Therefore, the pivoting of the armrest is prevented by the pivot preventing portion formed at the side of the seat back and the simply-structured prevented portion of the pad.

The armrest may be pivotally attached to the seat back via the pivot shaft, the pivot preventing portion may be a part of a protrusion, and the protrusion may be elongated and extend in a radial direction of the pivot shaft. According to the aforementioned configuration, the protrusion partially having the pivot preventing portion is elongated and extends in the radial direction of the pivot shaft. Therefore, the pivoting of the armrest is prevented by the easily-structured pivot preventing portion formed at the side of the seat back and the prevented portion of the pad.

The seat back may include a back-side pad and a back-side cover covering the back-side pad, and the pivot preventing portion may be formed at the back-side pad. According to the aforementioned configuration, the pivot preventing portion is formed at the back-side pad of the seat back. Therefore, it is possible to manufacture easily the seat back having the structure by which the seat back locks the armrest. Further, it is possible to manufacture easily the conveyance seat having such seat back. As a result, it is possible to reduce the manufacturing cost. Also, the back-side pad is covered with the back-side cover. Therefore, it is possible to make the pivot preventing portion inconspicuous from outside.

The pivot preventing portion may be a part of a protrusion, and the protrusion may be formed by a central portion of the side of the seat back in a seat front-to-back direction protruding towards the storage space. According to the aforementioned configuration, the protrusion partially having the pivot preventing portion is formed by the central portion in the seat front-to-back direction protruding towards the storage space. Therefore, the pivot preventing portion to prevent the pivoting of the armrest can be formed by the simply structured protrusion.

The pivot preventing portion may be a part of the protrusion, and a tilt angle at a seat front-side of the protrusion may be different from a tilt angle at a seat rear-side of the protrusion. According to the aforementioned configuration, the tilt angle at the vehicle front side of the protrusion is different from the tilt angle at the vehicle rear-side of the protrusion. Therefore, it is possible to adjust a resistance generated at a time of drawing the armrest out of the storage space and a resistance generated at a time of storing the armrest into the storage space, according to the pivoting state of the armrest.

The tilt angle at the seat front-side of the protrusion may be greater than the tilt angle at the seat rear-side of the protrusion. According to the aforementioned configuration, the tilt angle at the seat front-side of the protrusion is greater than the tilt angle at the seat rear-side of the protrusion. Therefore, a resistance generated at a time of pulling the armrest out of the storage space becomes smaller than a resistance generated at a time of storing the armrest in the storage space. Accordingly, it makes it possible to easily draw the armrest when the armrest is pulled out of the storage position and to easily restrict the armrest to a predetermined position when the armrest enters the storage space to be stored.

According to the conveyance seat of the present disclosure, the armrest is prevented from pivoting by the structure that is inconspicuous from outside. Further, it is possible to easily manufacture the armrest having the structure by which the armrest is locked to the seat back. Still further, it is possible to manufacture easily the conveyance seat having such armrest. As a result, the manufacturing cost can be reduced. According to the conveyance seat of the present disclosure, the pivotable armrest pivotally attached on a part of the seat is easily engaged with the pivot preventing portion. According to the conveyance seat of the present disclosure, the armrest is prevented from pivoting by the pivot preventing portion formed at the side of the seat back and the simply-configured prevented portion of the pad. According to the conveyance seat of the present disclosure, the armrest is prevented from pivoting by the simply-structured pivot preventing portion formed at the side of the seat back and the prevented portion formed at the armrest. According to the conveyance seat of the present disclosure, it is possible to easily manufacture the seat back having the structure by which the seat back locks the armrest. Further, it is possible to easily manufacture the conveyance seat having such seat back. As a result, the manufacturing cost is reduced. Still further, the pivot preventing portion is made inconspicuous from outside. Further, according to the conveyance seat of the present disclosure, the pivot preventing portion to prevent the pivoting of the armrest is formed with a simple configuration. Still further, according to the conveyance seat of the present disclosure, it is possible to adjust the resistance generated at a time of drawing the armrest from the storage space and the resistance generated at a time of storing the armrest, according to the pivoting state of the armrest. Still further, according to the conveyance seat of the present disclosure, it makes is possible to easily draw the armrest when the armrest is pulled out of the storage position and to easily restrict the armrest to a predetermined position when the armrest enters the storage space to be stored.

BRIEF DESCRIPTION OF THE DRAWINGS

Various embodiments of the invention are illustrated in the drawings, in which.

DETAILED DESCRIPTION

Specific embodiments of the present disclosure (hereinafter, referred to as embodiments) is described below with reference to the drawings. However, it should be understood that the embodiments described below are instances in order to assist understanding of the present disclosure, and do not limit the present disclosure. That is, it is understood that the present disclosure shall be changed and modified without departing from the spirit and scope of the present disclosure and the present disclosure encompasses equivalents thereof.

Hereinafter, a front-to-back direction means a front-to-back direction as seen from a seated occupant seated on a conveyance seat, i.e., a direction corresponding to a vehicle traveling direction. The front-to-back direction is also referred to as a seat front-to-back direction. A width direction means a right and left direction of the conveyance seat. A height direction means a height direction of the conveyance seat, more specifically an up and down direction when the conveyance seat is seen from the front.

Entire Configuration of Conveyance Seat

Figure 1:
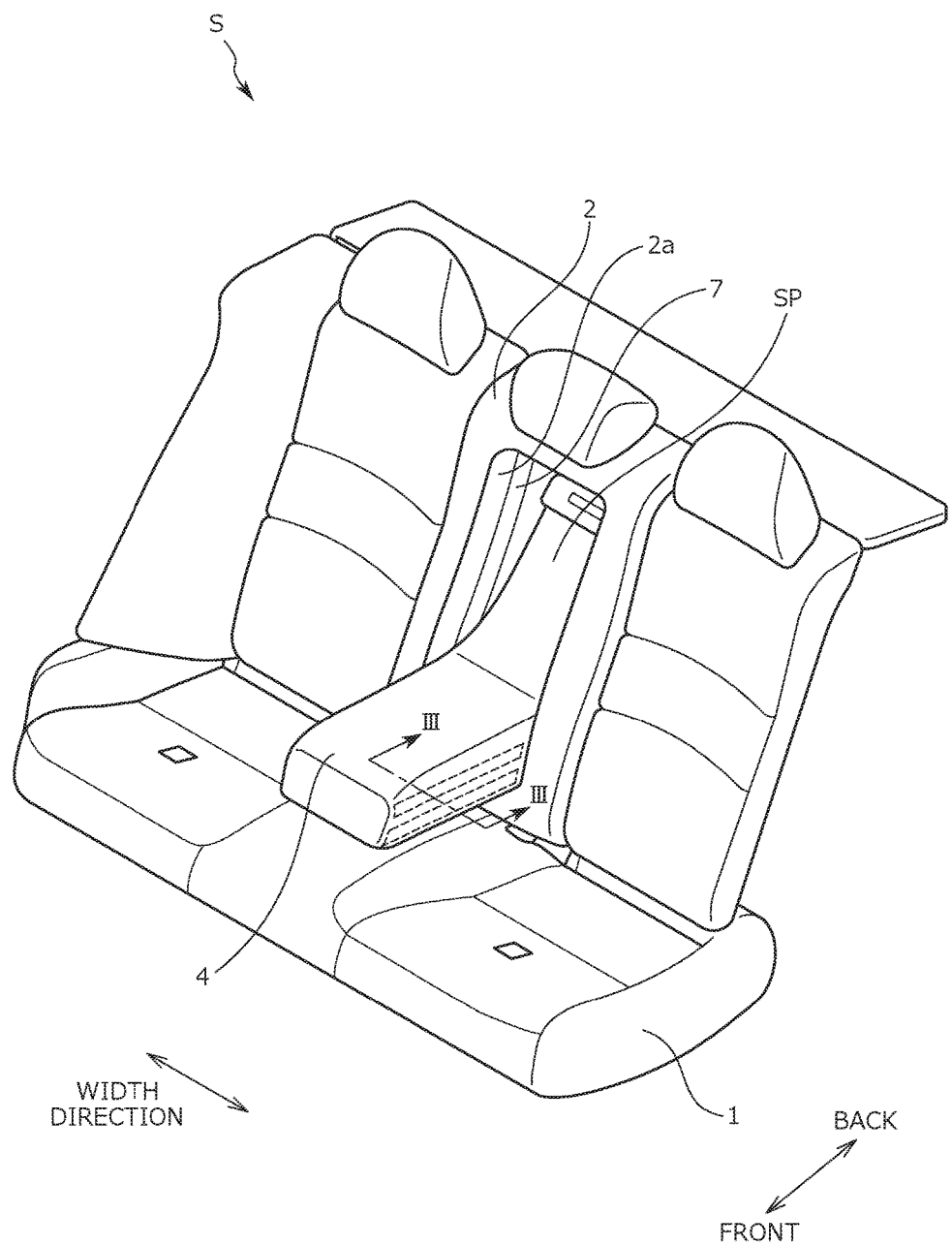
FIG. 1 is a view illustrating a conveyance seat according to an embodiment of the present disclosure and a perspective view illustrating an armrest pulled out.
Figure 2:
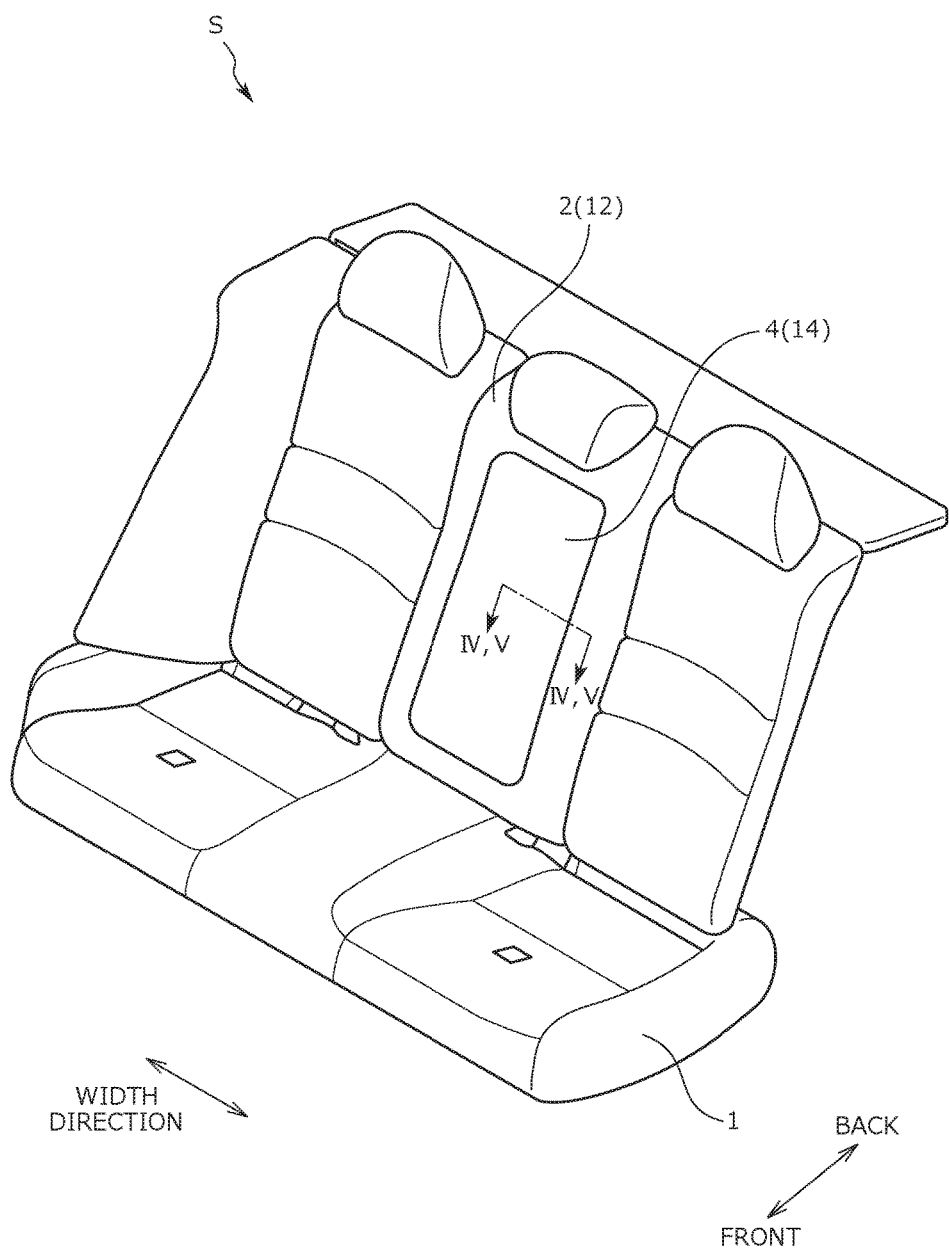
FIG. 2 is a view illustrating the conveyance seat according to the embodiment of the present disclosure and a perspective view illustrating the armrest stored.

The entire structure of a seat S for a vehicle according to the embodiment is described with reference to FIGS. 1 and 2. FIG. 1 illustrates the seat S according to the embodiment and is a perspective view illustrating an armrest 4 pulled out. FIG. 2 is a perspective view illustrating the armrest 4 stored.

The seat S according to the embodiment configures a rear seat of the vehicle and mainly includes a seat cushion 1 being a seat portion, a seat back 2 being a backrest, and the armrest 4 pivotally attached to the seat back 2.

The seat back 2 has a storage space SP formed at a central portion in the width direction of the seat back 2, and the armrest 4 is allowed to be stored in the storage space SP. The armrest 4 is attached to the seat back 2 to pivot about a pivot shaft 4a (see FIG. 3) between a storage position where the armrest 4 is stored in the storage space SP and a pull-out position (also referred to as a usage position) where the armrest 4 is pulled out of the storage space SP.

When the armrest 4 is at the usage position as illustrated in FIG. 1, a seated occupant can put on the armrest 4 his/her arm, a cell phone, a cup, and so on. When the armrest 4 is at the storage position as illustrated in FIG. 2, the armrest 4 can be used as the backrest, and three occupants can be seated on the seat S.

The seat back 2 has a side 2a that is a side surface of a portion defining the storage space SP. Formed at the central portion of the side 2a in the front-to-back direction is a protrusion 7 that is configured to prevent the pivoting of the armrest 4 stored in the storage space SP to the usage position. The protrusion 7 extends in the up-and-down direction at the side 2a. The protrusion 7 is described in detail below.

Armrest Pivot Preventing Mechanism

Figure 3:
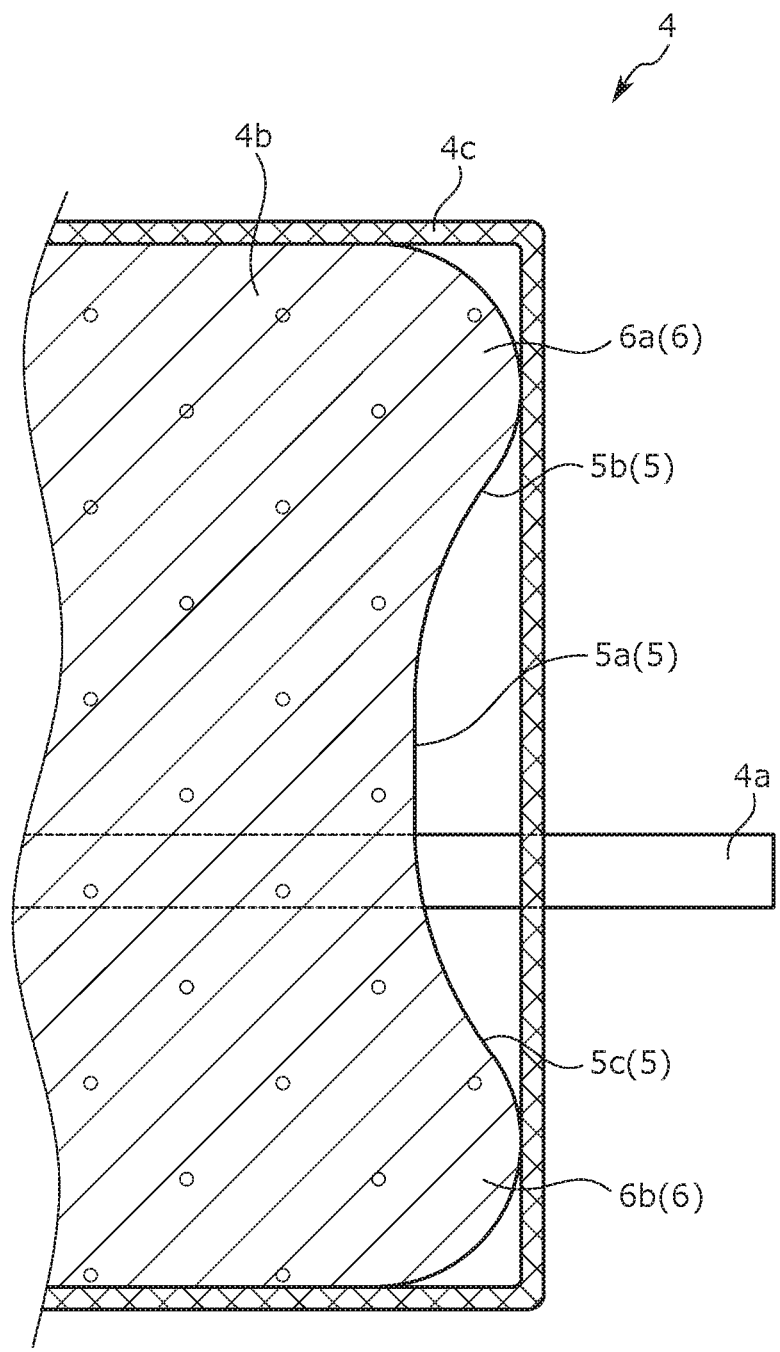
FIG. 3 is a view schematically illustrating a cross section of the armrest in a pulled-out state and a cross sectional view illustrating a cross section taken along of FIG. 1.
Figure 4:
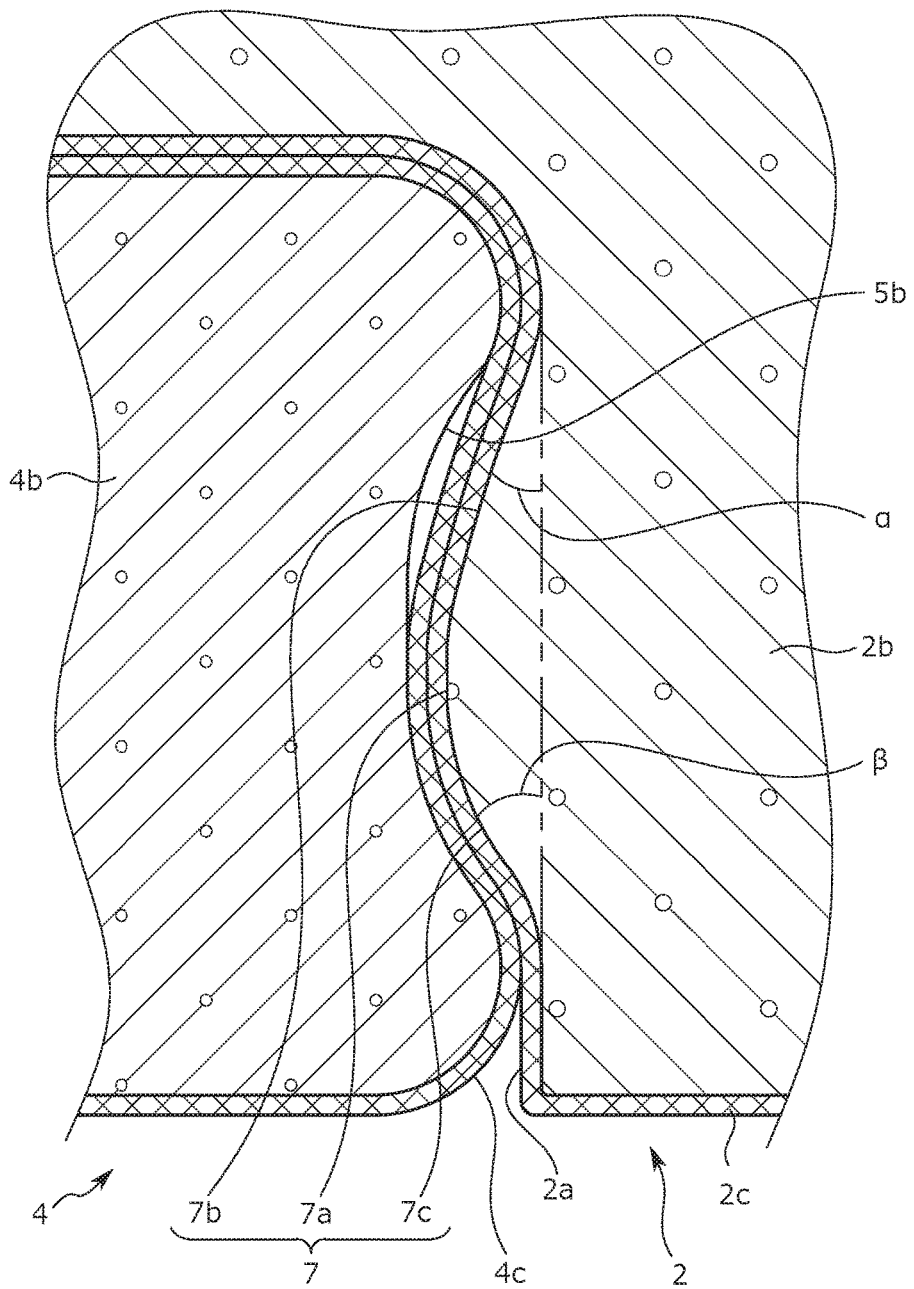
FIG. 4 is a view schematically illustrating a cross section of the armrest in a stored state and a cross sectional view illustrating a cross section taken along IV-IV of FIG. 2.

A pivot preventing mechanism for the armrest 4 is described with reference to FIGS. 3 and 4 illustrating the cross sections of the armrest 4 and the seat back 2. FIG. 3 is a view schematically illustrating the cross section of the armrest 4 in the pulled-out state and is a cross sectional view illustrating a cross section take along of FIG. 1. FIG. 4 is a view schematically illustrating the cross section of the armrest 4 in the stored state and is a cross sectional view illustrating a cross section taken along IV-IV of FIG. 2.

Armrest

The armrest 4 includes a pad 4b and a cover 4c covering the pad 4b and is attached to the seat back 2 to be pivotable about the pivot shaft 4a. Recesses 5 are provided at opposite side surfaces of the pad 4b in the seat width direction. Each of the recesses 5 extends along the longitudinal direction of the armrest 4.

Each of the recesses 5 includes a planar bottom 5a, a back-side end 5b, and a cushion-side end 5c. The back-side end 5b is formed at the side of the seat back 2 in a direction of pivoting of the armrest 4. The cushion-side end 5c is formed at the side of the seat cushion 1 in the direction of pivoting of the armrest 4.

Because the bottom 5a of the recess 5 is in a planar shape, the pad 4b is simple in structure. The back-side end 5b corresponds to a prevented portion which is engaged with a rear-side end 7b (described below) of the seat back 2 to prevent the pivoting of the armrest 4 from a stored state to a pulled-out state. The bottom 5a, the back-side end 5b, and the cushion-side end 5c are formed along the longitudinal direction of the armrest 4, in other words, extending elongated in the radial direction of the pivot shaft 4a. In this manner, the back-side end 5b is elongated and extends in the radial direction of the pivot shaft 4a. Therefore, the armrest 4 pivotally attached to a portion of the seat S is easily engaged with the rear-side end 7b as described below. Further, the back-side end 5b is arranged backward of the rear-side end 7b, as described in detail below, when the armrest 4 is at the storage position.

The pad 4b has a back-side protrusion 6a being a rear-end portion of the pad 4b and a cushion-side protrusion 6b being a front-end portion of the pad 4b when the armrest 4 is at the storage position. The recess 5 is formed by the protrusions 6a and 6b that protrude toward the side 2a of the seat back 2. In other words, the back-side protrusion 6a is formed at the side of the seat back 2 in the direction of pivoting and the cushion-side protrusion 6b is formed at the side of the seat cushion 1 in the direction of pivoting. Further, the back-side protrusion 6a and the cushion-side protrusion 6b extend along the longitudinal direction of the armrest 4.

An end of the back-side protrusion 6a at the side of the seat cushion 1 in the direction of pivoting of the armrest 4 is the back-side end 5b that is positioned closer to the seat back 2 than the cushion-side end 5c. An end of the cushion-side protrusion 6b at the side of the seat back 2 in the direction of pivoting of the armrest 4 is the cushion-side end 5c that is positioned closer to the seat cushion 1 than the back-side end 5b. In other words, the back-side protrusion 6a and the cushion-side protrusion 6b are also formed along the longitudinal direction of the armrest 4, i.e., extending elongated in the radial direction of the pivot shaft 4a.

As described above, the pad 4b covered with the cover 4c has the back-side end 5b which is engageable with the rear-side end 7b of the protrusion 7 of the seat back 2, as described below. Accordingly, the pivoting of the armrest 4 is prevented by the structure that is not conspicuous from the outside.

Seat Back

The seat back 2 includes a pad 2b as a back-side pad and a cover 2c as a back-side cover covering the pad 2b. The seat back 2 has the protrusion 7 at the side 2a defining the storage space SP. The protrusion 7 includes a center end 7a as a central portion positioned at the center in the front-to-back direction, the rear-side end 7b positioned rearward of the center end 7a, and a front-side end 7c positioned forward of the center end 7a. The protrusion 7 having the center end 7a, the rear-side end 7b, and the front-side end 7c is elongated and extends in the radial direction of the pivot shaft 4a.

The center end 7a is big enough to be accommodated in the recess 5 of the armrest 4 and is formed protruding toward the storage space SP relative to its surrounding portion. The rear-side end 7b is a pivot preventing portion that is configured to prevent pivoting of the armrest 4 stored in the storage space SP to the usage position. The rear-side end 7b is arranged on a path of the back-side end 5b of the recess 5 created when the armrest 4 pivots from the usage position to the storage position.

A tilt angle α of the rear-side end 7b of the protrusion at the seat rear-side is different from a tilt angle β of the front-side end 7c thereof at the seat front-side. Specifically, the tilt angle β at the seat front-side is greater than the tilt angle α at the seat rear-side. Because these two tilt angles are not the same, it is possible to preferably adjust a resistance generated at a time of drawing the armrest 4 from the storage space SP and a resistance generated at a time of storing the armrest 4 in the storage space SP, according to the pivoting state of the armrest 4.

Especially, when the tilt angle β is greater than the title angle α, the resistance generated when the armrest 4 is pulled out of the storage space SP becomes smaller than the resistance generated when the armrest 4 is stored. Accordingly, it is possible to easily pull out the armrest 4 when the armrest 4 is drawn from the storage position. Further, it becomes easier to restrict the armrest 4 to a predetermined position when the armrest 4 is being stored in the storage space SP.

In terms of preventing the armrest 4 from being pulled out of the storage space SP, it is only necessary that the back-side end 5b of the armrest 4 is arranged rearward of the rear-side end 7b of the protrusion 7 when the armrest 4 is at the storage position, in an embodiment. That is, the cushion-side end 5c and the cushion-side protrusion 6b of the recess 5 and the front-side end 7c of the protrusion 7 all function to restrict the armrest 4 from entering the storage space SP to be stored. These three components 5c, 6b, and 7c may have any desired configuration.

As described above, the pad 4b easily molded has the recess 5 having the back-side end 5b by which the armrest 4 is prevented from pivoting. In the same manner, the pad 2b easily molded has the protrusion 7 having the rear-side end 7b that is able to prevent the pivoting of the armrest 4. Accordingly, it is possible to easily manufacture the structure by which the armrest 4 is locked to the seat back 2. Therefore, it is possible to easily manufacture the seat S having the seat back 2 and the armrest 4 as described above. Accordingly, it is possible to reduce the manufacturing cost of the seat S.

Further, the recess 5 including the back-side end 5b, which abuts the rear-side end 7b of the protrusion 7 via the cover 2c and the front-side end 7c, is covered with the cover 4c. Therefore, the armrest 4 is prevented from pivoting by the structure that is inconspicuous from outside. Further, the armrest 4 is prevented from pivoting by the rear-side end 7b of the protrusion 7 formed at the side 2a of the seat back 2 and the simply-structured back-side end 5b of the recess 5 formed at the pad 4b.

In the same manner, the pad 2b having the rear-side end 7b of the protrusion 7 is covered with the cover 2c. Therefore, it is possible to make the rear-side end 7b of the protrusion 7 inconspicuous from the outside. Further, the protrusion 7 having the rear-side end 7b which prevents the pivoting of the armrest 4 is elongated and extends in the radial direction of the pivot shaft 4a. Therefore, it is possible to prevent the armrest 4 from pivoting by the simply-structured rear-side end 7b formed at the side 2a of the seat back 2.

Modified Examples

Figure 5:
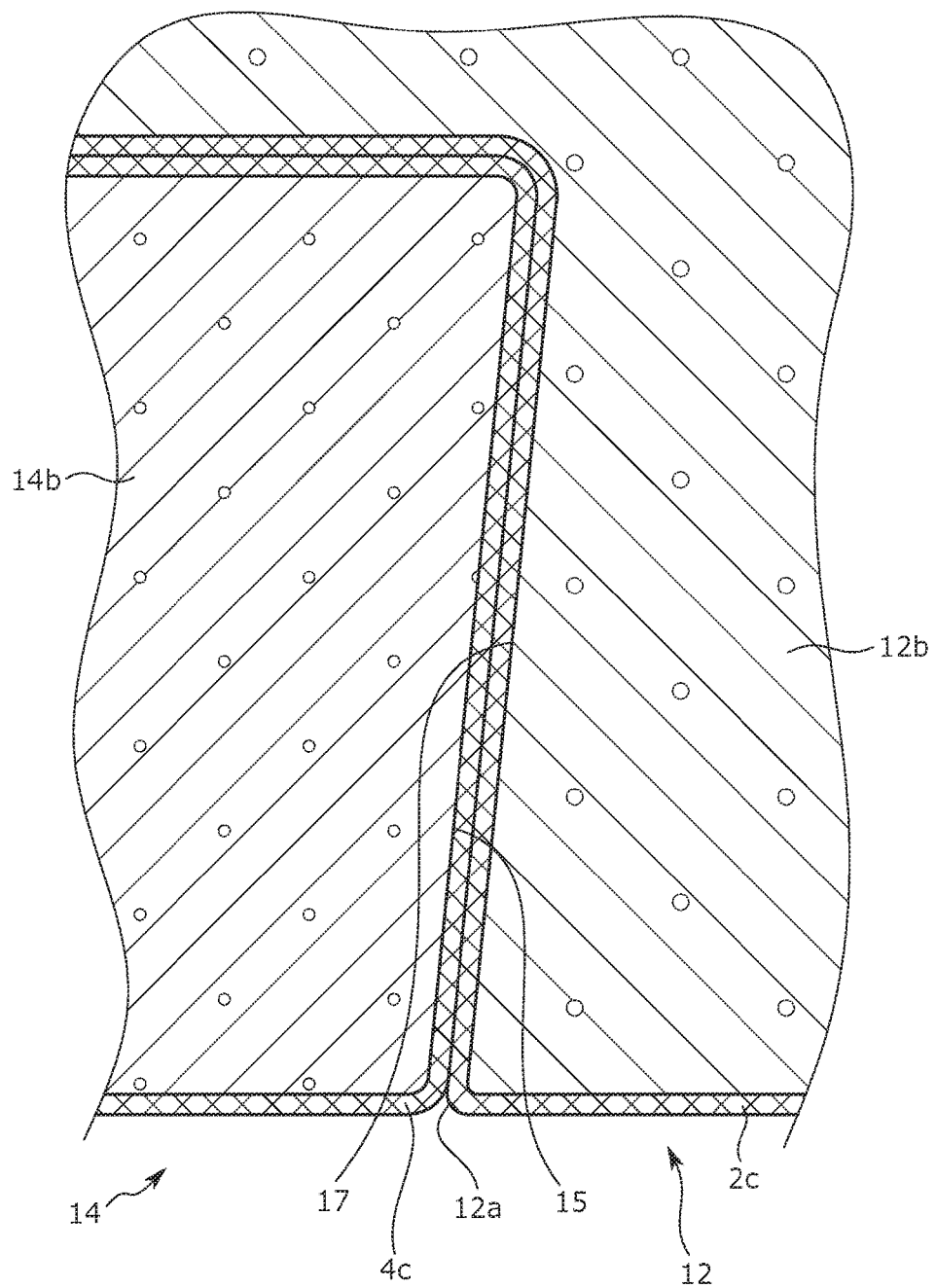
FIG. 5 is a view schematically illustrating a cross section of an armrest in a stored state according to a modified example and is a cross-sectional view illustrating a cross section taken along V-V of FIG. 2.

According to the configuration of the above-described embodiment, the protrusion 7 is formed at the side of the seat back 2, and the recess 5 is formed at the side of the armrest 4. However, the present disclosure is not limited thereto. For example, as illustrated in FIG. 5, an armrest 14 may be prevented from pivoting by a configuration where a seat back 12 and the armrest 14 abut and are engaged with each other via inclined surfaces 15, 17 tilted in a seat width direction relative to the front surface of the seat back 12. FIG. 5 is a view schematically illustrating a cross section of the armrest 14 in a stored state according to a modified example and a cross section illustrating a cross section taken along V-V of FIG. 2.

Specifically, the inclined surface 15 is a surface of a pad 14b of the armrest 14 and is positioned at the side of the storage space SP. The inclined surface 15 extends toward the storage space SP as it is advanced rearward from the front surface of the armrest 14. The inclined surface 17 is a surface of a pad 12b being the back-side pad of the seat back 12 and is positioned at the side of the storage space SP. The inclined surface 17 may extend along the inclined surface 15. Specifically, the inclined surface 17 extends in a direction to separate from the storage space SP as it is advanced rearward from the front surface of the seat back 12.

Also when the seat back 12 and the armrest 14 are configured as described above, the armrest 14 can still be preferably prevented from pivoting. Specifically, a side 12a of the seat back 12 defines the storage space SP. A portion of the side 12a, where the inclined surface 17 of the pad 12b is covered with the cover 2c, abuts and is engaged with a portion of the armrest 14, where the inclined surface 15 is covered with the cover 4c. As a result, the armrest 14 is prevented from pivoting. Further, the inclined surface 17 formed at the pad 12b of the seat back 12 and the inclined surface 15 formed at the pad 14b of the armrest 14 may be formed in a planar shape or in a curved shape.

The seat according to the present disclosure can be applied to vehicles. Further, the seat may be applied as the conveyance seat to ships, airplanes, machines having seats, or other conveyances, which include seats in which armrests are allowed to be stored in and pulled out of storage spaces.

What is claimed is:

1. A conveyance seat comprising:
a seat back that has a storage space;
an armrest that is attached to the seat back and configured to be pivotable between a storage position where the armrest is stored in the storage space and a usage position where the armrest is pulled out of the storage space; and
a pivot preventing portion that is formed at a side of the seat back, the side defining the storage space, and the pivot preventing portion being configured to prevent the armrest stored in the storage space from pivoting to the usage position, wherein
the armrest comprises a pad and a cover that covers the pad,
the pad has a complementary pivot preventing portion that engages with the pivot preventing portion when the armrest is at the storage position,
the pivot preventing portion is arranged on a path of the complementary pivot preventing portion along which the armrest pivots from the usage position to the storage position, and
the complementary pivot preventing portion is arranged rearward of the pivot preventing portion when the armrest is at the storage position.

2. The conveyance seat according to claim 1, wherein
the armrest is pivotally attached to the seat back via a pivot shaft, and
the complementary pivot preventing portion of the armrest is elongated and extends in a radial direction of the pivot shaft;
the pivot preventing portion is a part of a protrusion of the seat back,
the protrusion is elongated and extends in a radial direction of the pivot shaft, and
the pivot preventing portion and the complementary pivot preventing portion extend along with each other.

3. The conveyance seat according to claim 1, wherein
the complementary pivot preventing portion is a part of a recess of the armrest, and
the recess is formed by a front-end portion and a rear-end portion of the pad that protrude towards the side of the seat back when the armrest is at the storage position.

4. The conveyance seat according to claim 1, wherein
the seat back includes a back-side pad and a back-side cover that covers the back-side pad,
the back-side pad includes a first back-side pad and a second back-side pad that face each other,
the pivot preventing portion includes a first pivot preventing portion that is formed at the first back-side pad and a second pivot preventing portion that is formed at the second back-side pad, and
the first pivot preventing portion and the second pivot preventing portion face each other.

5. The conveyance seat according to claim 1, wherein
the pivot preventing portion is a part of a protrusion of the seat back, and the protrusion is formed by a central portion of the side of the seat back in a seat front-to-back direction, protrudes towards the storage space, and protrudes towards a seat right-to-left direction.

6. The conveyance seat according to claim 1, wherein the pivot preventing portion is a part of a protrusion of the seat back, and
a tilt angle at a seat front-side of the protrusion is different from a tilt angle at a seat rear-side of the protrusion.

7. The conveyance seat according to claim 6, wherein the tilt angle at the seat front-side of the protrusion is greater than the tilt angle at the seat rear-side of the protrusion.

8. A conveyance seat comprising:
a seat back that has a storage space;
an armrest that is attached to the seat back and configured to be pivotable between a storage position where the armrest is stored in the storage space and a usage position where the armrest is pulled out of the storage space; and
a pivot preventing portion that is formed at a side of the seat back, the side defining the storage space, and the pivot preventing portion being configured to prevent the armrest stored in the storage space from pivoting to the usage position, wherein
the armrest comprises a pad and a cover that covers the pad,
the pad has a complementary pivot preventing portion that engages with the pivot preventing portion,
the pivot preventing portion is arranged on a path of the complementary pivot preventing portion along which the armrest pivots from the usage position to the storage position, and
the complementary pivot preventing portion is arranged rearward of the pivot preventing portion when the armrest is at the storage position,
the complementary pivot preventing portion is a part of a recess of the armrest, and
the recess is formed by a front-end portion and a rear-end portion of the pad that protrude towards the side of the seat back when the armrest is at the storage position.

9. The conveyance seat according to claim 8, wherein the armrest is pivotally attached to the seat back via a pivot shaft, and
the complementary pivot preventing portion of the armrest is elongated and extends in a radial direction of the pivot shaft.

10. The conveyance seat according to claim 8, wherein the armrest is pivotally attached to the seat back via a pivot shaft,
the pivot preventing portion is a part of a protrusion of the seat back, and
the protrusion is elongated and extends in a radial direction of the pivot shaft.

11. The conveyance seat according to claim 8, wherein the seat back includes a back-side pad and a back-side cover that covers the back-side pad,
the back-side pad includes a first back-side pad and a second back-side pad that face each other,
the pivot preventing portion includes a first pivot preventing portion that is formed at the first back-side pad and a second pivot preventing portion that is formed at the second back-side pad, and
the first pivot preventing portion and the second pivot preventing portion face each other.

12. The conveyance seat according to claim 8, wherein the pivot preventing portion is a part of a protrusion of the seat back, and
the protrusion is formed by a central portion of the side of the seat back in a seat front-to-back direction, protrudes towards the storage space, and protrudes towards a seat right-to-left direction.

13. A conveyance seat comprising:
a seat back that has a storage space;
an armrest that is attached to the seat back and configured to be pivotable between a storage position where the armrest is stored in the storage space and a usage position where the armrest is pulled out of the storage space; and
a pivot preventing portion that is formed at a side of the seat back, the side defining the storage space, and the pivot preventing portion being configured to prevent the armrest stored in the storage space from pivoting to the usage position, wherein
the armrest comprises a pad and a cover that covers the pad,
the pad has a complementary pivot preventing portion that is engageable with the pivot preventing portion,
the pivot preventing portion is arranged on a path of the complementary pivot preventing portion along which the armrest pivots from the usage position to the storage position, and
the complementary pivot preventing portion is arranged rearward of the pivot preventing portion when the armrest is at the storage position,
the complementary pivot preventing portion is a part of a recess of the armrest, and
a bottom of the recess is formed in a planar shape.

14. The conveyance seat according to claim 13, wherein the armrest is pivotally attached to the seat back via a pivot shaft, and
the complementary pivot preventing portion of the armrest is elongated and extends in a radial direction of the pivot shaft.

15. The conveyance seat according to claim 13, wherein the complementary pivot preventing portion is a part of a recess of the armrest, and
the recess is formed by a front-end portion and a rear-end portion of the pad that protrude towards the side of the seat back when the armrest is at the storage position.

16. The conveyance seat according to claim 13, wherein the armrest is pivotally attached to the seat back via a pivot shaft,
the pivot preventing portion is a part of a protrusion of the seat back, and
the protrusion is elongated and extends in a radial direction of the pivot shaft.

17. The conveyance seat according to claim 13, wherein the seat back includes a back-side pad and a back-side cover that covers the back-side pad,
the back-side pad includes a first back-side pad and a second back-side pad that face each other,
the pivot preventing portion includes a first pivot preventing portion that is formed at the first back-side pad and a second pivot preventing portion that is formed at the second back-side pad, and
the first pivot preventing portion and the second pivot preventing portion face each other.

18. The conveyance seat according to claim 13, wherein the pivot preventing portion is a part of a protrusion of the seat back, and the protrusion is formed by a central portion of the side of the seat back in a seat front-to-back direction, protrudes towards the storage space, and protrudes towards a seat right-to-left direction.

19. The conveyance seat according to claim 13, wherein the complementary pivot preventing portion engages with the pivot preventing portion when the armrest is at the storage position.

* * * * *